United States Patent
Ye

(10) Patent No.: US 11,112,894 B2
(45) Date of Patent: Sep. 7, 2021

(54) METHOD FOR MANUFACTURING TOUCH PANEL, TOUCH PANEL AND DISPLAY DEVICE

(71) Applicant: Wuhan China Star Optoelectronics Semiconductor Display Technology Co., Ltd., Hubei (CN)

(72) Inventor: Jian Ye, Guangdong (CN)

(73) Assignees: WUHAN CHINA STAR OPTOELECTRONICS, Hubei (CN); SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 481 days.

(21) Appl. No.: 16/080,267

(22) PCT Filed: Apr. 19, 2018

(86) PCT No.: PCT/CN2018/083807
§ 371 (c)(1),
(2) Date: Aug. 27, 2018

(87) PCT Pub. No.: WO2019/178909
PCT Pub. Date: Sep. 26, 2019

(65) Prior Publication Data
US 2021/0081064 A1    Mar. 18, 2021

(30) Foreign Application Priority Data

Mar. 20, 2018    (CN) .......................... 201810229498.7

(51) Int. Cl.
*G06F 3/041*    (2006.01)
*G06F 3/044*    (2006.01)

(52) U.S. Cl.
CPC .......... *G06F 3/0412* (2013.01); *G06F 3/0445* (2019.05); *G06F 2203/04102* (2013.01); *G06F 2203/04103* (2013.01)

(58) Field of Classification Search
CPC combination set(s) only.
See application file for complete search history.

(56) References Cited

U.S. PATENT DOCUMENTS

2017/0199609 A1*    7/2017 Lee ..................... G06F 3/04164

FOREIGN PATENT DOCUMENTS

| CN | 102646004 A | 8/2012 |
|---|---|---|
| CN | 103412669 A | 11/2013 |

(Continued)

OTHER PUBLICATIONS

International search report dated Dec. 27, 2018 from corresponding application No. PCT/CN2018/083807.

*Primary Examiner* — Deeprose Subedi
(74) *Attorney, Agent, or Firm* — Leong C. Lei

(57) ABSTRACT

The invention provides a method for manufacturing touch panel, comprising: providing a substrate, and forming a first metal layer on the substrate; patterning the first metal layer to form a first electrode and a first pin, electrically interconnected; forming an insulating layer on the first electrode, and forming an opening in the insulating layer to expose the first pin; forming a second metal layer on the insulating layer, patterning the second metal layer to form a second electrode and a second pin, electrically interconnected; the first electrode being disposed opposite to the second electrode, the second pin being formed inside the opening, the first and second pins being arranged in a zigzag manner. The invention also provides a touch panel and a display device. The first and second electrodes form capacitive touch panel (Continued)

with touch function. The metal-made first and second electrodes are bendable and suitable for flexible display device.

6 Claims, 12 Drawing Sheets

(56) References Cited

FOREIGN PATENT DOCUMENTS

| | | | |
|---|---|---|---|
| CN | 103926729 | A | 7/2014 |
| CN | 104035642 | A | 9/2014 |
| CN | 204650106 | U | 9/2015 |
| CN | 107340941 | A | 11/2017 |

* cited by examiner

METHOD FOR MANUFACTURING TOUCH PANEL, TOUCH PANEL AND DISPLAY DEVICE

CROSS REFERENCE TO RELATED APPLICATIONS

This application is a National Phase of International Application Number PCT/CN2018/083807, filed Apr. 19, 2018, and claims priority to Chinese Patent Application No. CN201810229498.7, filed on Mar. 20, 2018, the disclosure of which is incorporated herein by reference in its entirety.

BACKGROUND OF THE INVENTION

1. Field of the Invention

The present invention relates to the field of display and, in particular, to the field of a method for manufacturing touch panel, touch panel and display device.

2. The Related Arts

Display devices, especially display devices with touch functions, have become an indispensable part of daily lives for many users, and display devices can be seen both in entertainment and in the office. With the advancement of science and technology, flexible display devices have also emerged. The flexible display device is bendable and provides a new viewing experience while also being able to provide a larger field of vision. A display device having a touch function is generally formed by a combination of a touch panel and a display panel.

In the known technologies, the driving electrodes and the sensing electrodes of the conventional bridge-structured touch panel are located in the same layer, and the plurality of driving electrodes are arranged crosswise with the plurality of sensing electrodes. The driving electrodes and the sensing electrodes are made of indium tin oxide (ITO) material. Because ITO is a brittle semiconductor metal oxide, ITO is not suitable for flexible touch screen. If a metal mesh structure is used, since the area of the conductive material occupies only about 5%-10% of the entire electrode shape area, the contact area between the two ends of the conductive bridge is smaller, and the connection impedance is likely to be high or even at the risk of open circuit.

SUMMARY OF THE INVENTION

The primary object of the present invention is to provide a method for manufacturing touch panel, touch panel and display device, for solving the problems of the inability of applying the known touch panel technology to the flexible display device.

To solve the above technical issue, the present invention provides a method for manufacturing touch panel, which comprises:

providing a substrate, and forming a first metal layer on the substrate;

patterning the first metal layer to form a first electrode and a first pin, the first electrode and the first pin being electrically interconnected;

forming an insulating layer on the first electrode, and forming an opening in the insulating layer to expose the first pin;

forming a second metal layer on the insulating layer, patterning the second metal layer to form a second electrode and a second pin, the second electrode and the second pin being electrically interconnected; the first electrode being disposed opposite to the second electrode, the second pin being formed inside the opening, the first pin and the second pin being arranged in a zigzag manner.

According to a preferred embodiment of the present invention, during patterning the first metal layer to form the electrically interconnected first electrode and the first pin, the patterning the first metal layer also forms a first lead wire connecting the first electrode and the first pin.

According to a preferred embodiment of the present invention, during patterning the second metal layer to form the electrically interconnected the second electrode and the second pin, the patterning the second metal layer also forms a second lead wire connecting the second electrode and the second pin, and the second lead wire passes through the opening to connect with the second pin.

The present invention also provides touch panel, which comprises:

a substrate;

a first electrode and a first pin, disposed on the substrate, the first electrode and the first pin being electrically interconnected;

an insulating layer disposed on the first electrode, the insulating layer being disposed with an opening to expose the first pin;

a second electrode and a second pin, disposed on the insulating layer, the second electrode and the second pin being electrically interconnected, the first electrode being disposed opposite to the second electrode, the second pin being disposed inside the opening, and the first pin and the second pin being arranged in a zigzag manner.

According to a preferred embodiment of the present invention, the touch panel further comprises a first lead wire and a second lead wire, the first lead wire connects the first electrode to the first pin;

the second lead wire connects the second electrode to the second pin, and the second lead wire passes through the opening to connect with the second pin.

According to a preferred embodiment of the present invention, the number of the first electrodes and the number of the first pins are both a plurality, each first electrode is electrically connected to a corresponding first pin; the number of the second electrodes and the number of the second pins are both a plurality, each second electrode is electrically connected to a corresponding second pin.

According to a preferred embodiment of the present invention, the touch panel further comprises a flexible circuit board, the flexible circuit board is fixed to and connected to the first pins and the second pins.

According to a preferred embodiment of the present invention, a plurality of conductive touch strips are disposed at one end of the flexible circuit board, each conductive strip is electrically connected to a corresponding first pin or a corresponding second pin.

According to a preferred embodiment of the present invention, the openings comprises a first opening and a second opening: the first opening is located correspondingly to the first pin, the first opening is for exposing the first pin, the second opening is located correspondingly to the second pin, and the second pin is for extending the second lead wire and exposing the second pin.

The present invention also provides a display device, which comprises a display panel and a touch panel, the touch panel being fixed to a side of the display panel.

According to a preferred embodiment of the present invention, the touch panel comprises:

a substrate;

first electrode and a first pin, disposed on the substrate, the first electrode and the first pin being electrically interconnected;

an insulating layer disposed on the first electrode, the insulating layer being disposed with an opening to expose the first pin;

a second electrode and a second pin, disposed on the insulating layer, the second electrode and the second pin being electrically interconnected, the first electrode being disposed opposite to the second electrode, the second pin being disposed inside the opening, and the first pin and the second pin being arranged in a zigzag manner.

According to a preferred embodiment of the present invention, the touch panel further comprises a first lead wire and a second lead wire, the first lead wire connects the first electrode to the first pin;

the second lead wire connects the second electrode to the second pin, and the second lead wire passes through the opening to connect with the second pin.

According to a preferred embodiment of the present invention, the number of the first electrodes and the number of the first pins are both a plurality, each first electrode is electrically connected to a corresponding first pin; the number of the second electrodes and the number of the second pins are both a plurality, each second electrode is electrically connected to a corresponding second pin.

According to a preferred embodiment of the present invention, the touch panel further comprises a flexible circuit board, the flexible circuit board is fixed to and connected to the first pins and the second pins.

According to a preferred embodiment of the present invention, a plurality of conductive touch strips are disposed at one end of the flexible circuit board, each conductive strip is electrically connected to a corresponding first pin or a corresponding second pin.

According to a preferred embodiment of the present invention, the openings comprises a first opening and a second opening; the first opening is located correspondingly to the first pin, the first opening is for exposing the first pin, the second opening is located correspondingly to the second pin, and the second pin is for extending the second lead wire and exposing the second pin.

The present invention provides the following advantages: the first electrode and the second electrode are oppositely disposed to form a capacitive touch panel, which satisfies the touch requirement. The first electrode and the second electrode made of a metal material are easy to bend, are suitable for a flexible display device, and have low material impedance. The electrode and the first pin, the second electrode and the second pin can be patterned in the same process to reduce the manufacturing process and save the production cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort.

DETAILED DESCRIPTION OF THE PREFERRED EMBODIMENTS

To further explain the technical means and effect of the present invention, the following refers to embodiments and drawings for detailed description. Apparently, the described embodiments are merely some embodiments of the present invention, instead of all embodiments. All other embodiments based on embodiments in the present invention and obtained by those skilled in the art without departing from the creative work of the present invention are within the scope of the present invention.

The terms "comprising" and "having" and any variations thereof appearing in the specification, claims, and drawings of the present application are intended to cover non-exclusive inclusion. For example, a process, method, system, product, or device that includes a series of steps or units is not limited to the listed steps or units, but optionally also includes steps or units not listed, or alternatively, other steps or units inherent to these processes, methods, products or equipment. In addition, the terms "first", "second" and "third" are used to distinguish different objects and not intended to describe a particular order.

Refer to FIG. 1 to FIG. 18. The present invention provides a method for manufacturing a touch panel 100. The touch panel 100 is used in a display device. In a preferred embodiment, the touch panel 100 can be used in a flexible display device. In other words, the touch panel 100 is a bendable touch panel 100. The method for manufacturing the touch panel 100 comprises the following steps:

Step S101: providing a substrate 10 and forming a first metal layer 20 on the substrate 10.

Figure 1:
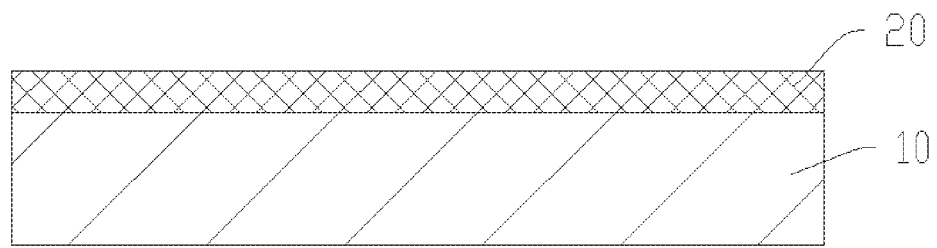
FIG. 1 is a schematic view showing step S101 of the method for manufacturing touch panel according to the present invention.

Refer to FIG. 1. The substrate 10 is a transparent substrate 10. The substrate 10 serves as a basis for forming the touch panel 100. The subsequent layered structure, such as the first metal layer 20, is directly or indirectly disposed on the substrate 10. In this embodiment, the substrate 10 is a flexible substrate 10, that is, the substrate 10 can be bent to a certain angle, and the flexible substrate 10 is favorable for making a flexible display device. In an embodiment, the first metal layer 20 is formed on the substrate 10 by a physical vapor deposition process.

Step S102: patterning the first metal layer 20 to form a first electrode 22 and a first pin 24, the first electrode 22 and the first pin 24 being electrically interconnected.

Figure 2:
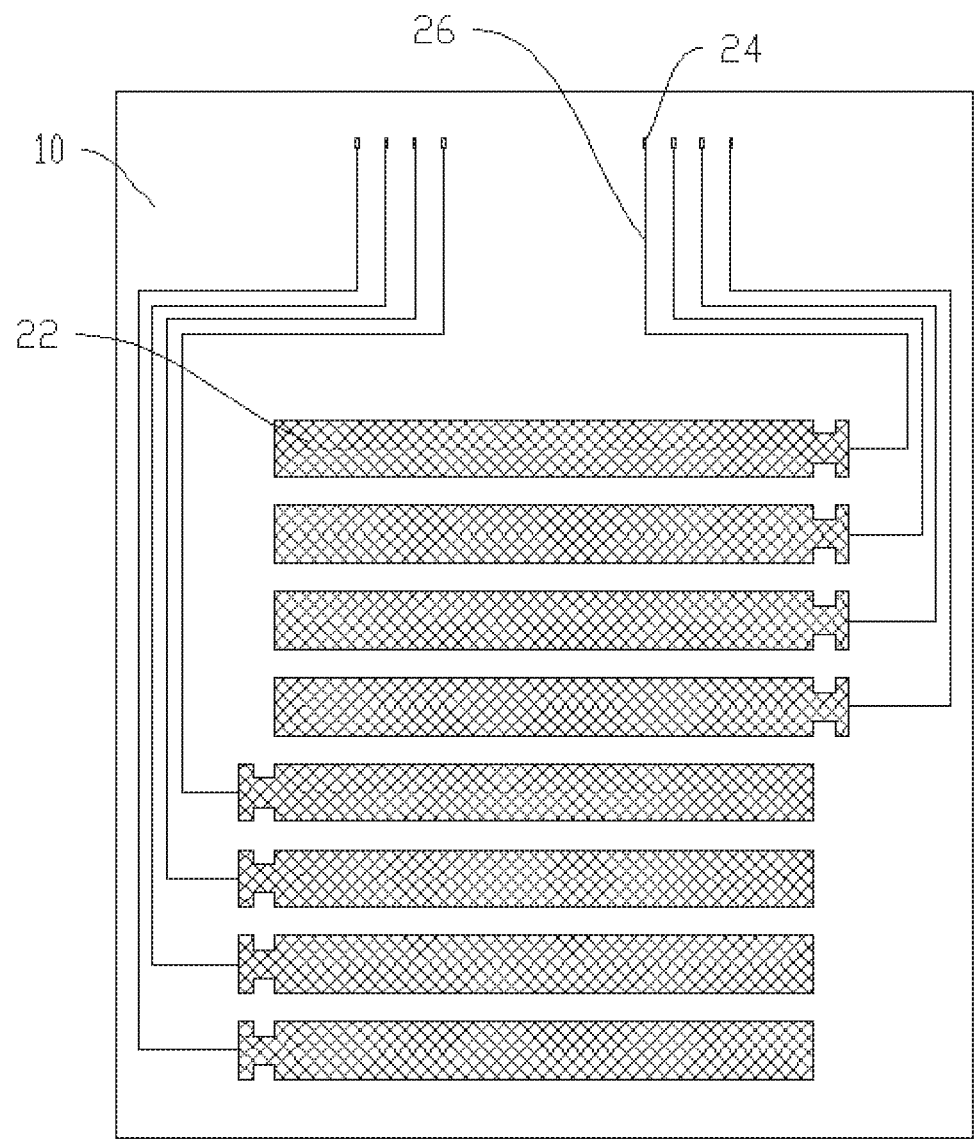
FIG. 2 is a schematic view showing step S102 of the method for manufacturing touch panel according to the present invention.
Figure 5:
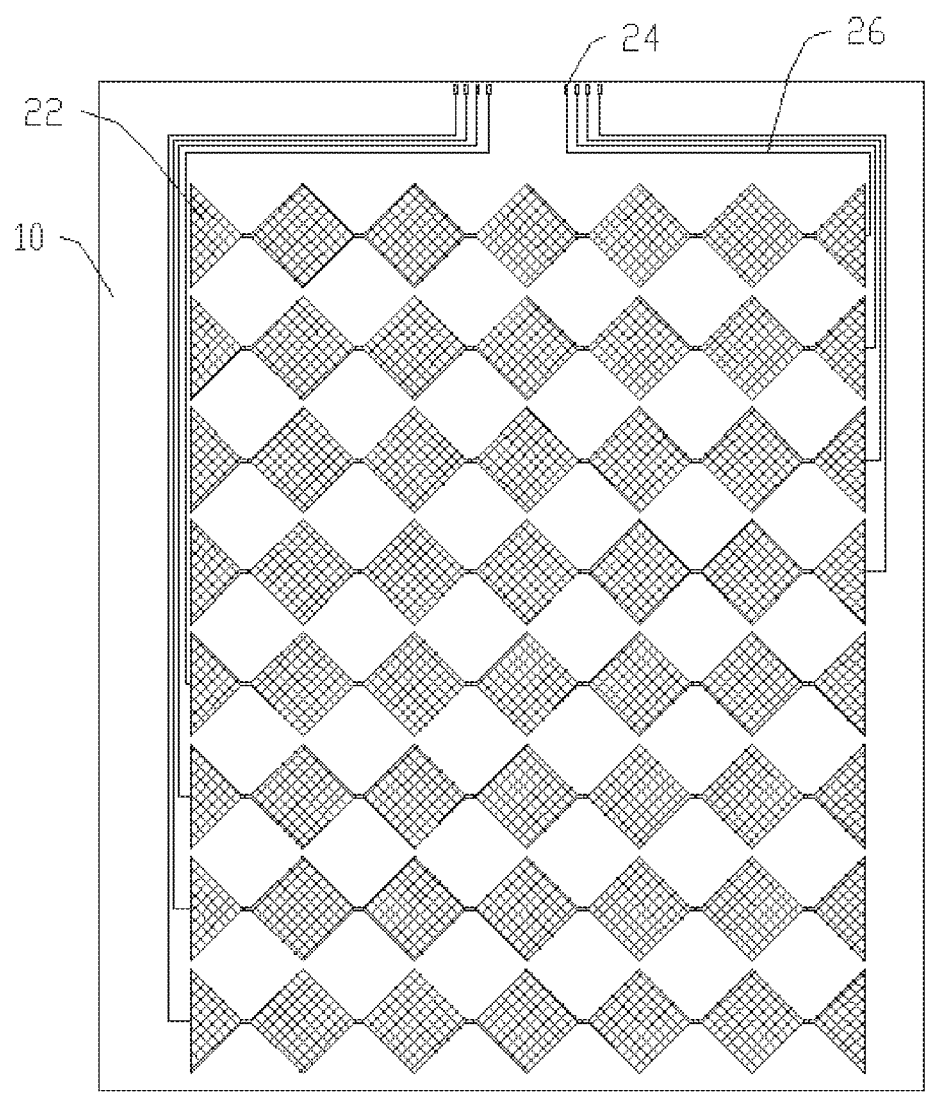
FIG. 5 is a schematic view showing an embodiment of step S102 of the method for manufacturing touch panel according to the present invention.

Refer to FIG. 2 to FIG. 5. After the first metal layer 20 is patterned, the first electrode 22 is formed. The first electrode 22 is a metal electrode, which is conductive and has low impedance. The metal electrode also provides a certain degree of flexibility and can be bent to a certain angle, which is advantageous for making a flexible display device. In an embodiment, as shown in FIG. 2, the first electrode 22 is stripe-shaped. In other embodiments, as shown in FIG. 5, the first electrode 22 is a diamond shape. Clearly, the shape of the first electrode 22 can also be other shapes.

Figure 3:
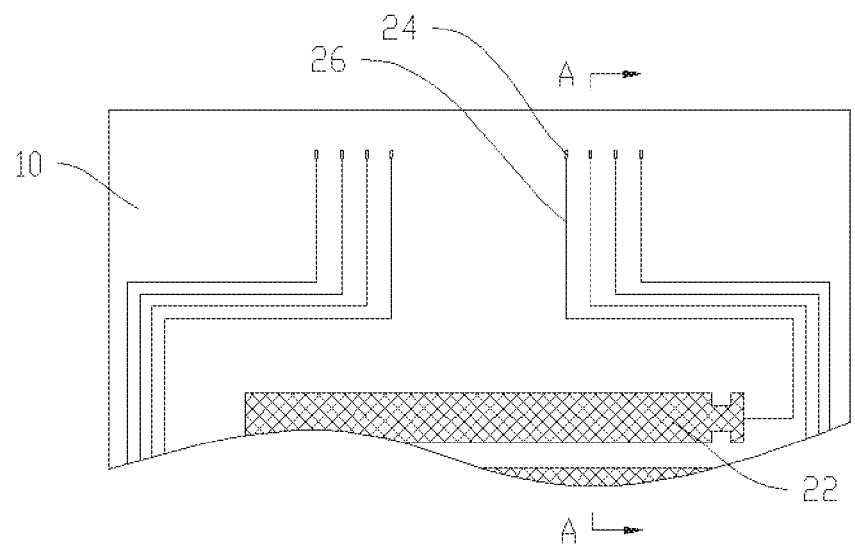
FIG. 3 is a partial enlarged view of FIG. 2.
Figure 4:
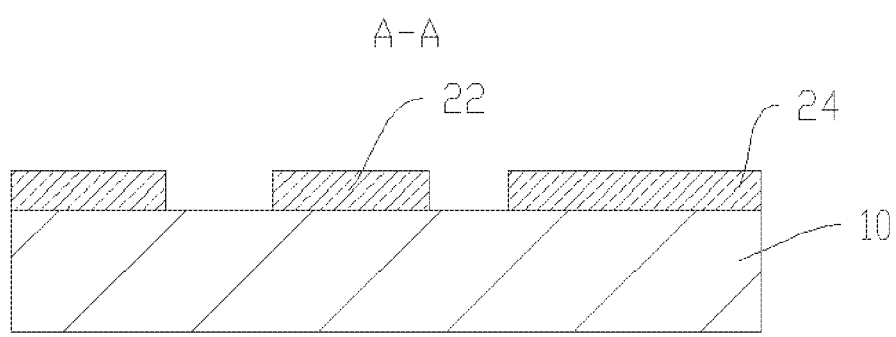
FIG. 4 is a schematic view showing the cross-section along A-A of FIG. 3.

Specifically, refer to FIG. 3. In the present embodiment, during patterning the first metal layer 20 to form the electrically interconnected first electrode 22 and the first pin 24, the patterning the first metal layer 20 also forms a first lead wire 26 connecting the first electrode 22 and the first pin 24. Specifically, the number of the first electrodes 22 and the number of the first pins 24 are both a plurality, each first electrode 22 is electrically connected to a corresponding first pin 24 through a first lead wire 26. The first electrode 22, the first pin 24 and the first lead wire 26 are all formed in the same patterning process. As such, the number of processes is reduced, the production efficiency is improved, the cost is saved. Moreover, the first electrode 22 and the first pin 24 are monolithically formed without using other element or material for bridging, which prevents defects caused by inaccurate bridging or increased impedance caused by bridging different materials. As a result, the yield rate is improved. In the present embodiment, the first pin 24 is a contact portion between the first lead wire 26 and a contact point of a flexible circuit board 70.

Refer to FIG. 2 or FIG. 3. In the present embodiment, the first lead wire 26 is formed on two sides of the first electrode 22, that is, the first lead wire 26 is located at both side edges of the subsequently formed touch panel 100. The first lead wire 26 is used to bypass the first electrode 22. On the other hand, the first lead wire 26 must be prevented from accumulating on one side of the first electrode 22 to cause uneven thickness on both sides of the touch panel 100 and affect the overall appearance of the display device.

In the present embodiment, the first metal layer 20 is patterned by using a lithography process. Specifically, the process of patterning the first metal layer 20 comprises a step of applying photoresist, exposing and developing, etching the first metal layer 20, and so on. The lithography technology is a mature patterning technology and can provide a good patterning effect to meet the requirement of making the touch panel 100 in the present embodiment.

Refer to FIG. 3. In the present embodiment, the first pin 24 is located at one end of the touch panel 100 in the length direction and the plurality of first pins 24 are arranged on the same straight line. In an embodiment, the first lead wire 26 is routed from the two sides of the first electrode 22, there is a gap between the first pins 24 respectively connected to two sides of the first electrode 22, and the gap is for disposing a second pin 54 subsequently.

S103: forming an insulating layer 30 on the first electrode 22 and forming an opening 40 in the insulating layer 30 to expose the first pin 24.

Figure 6:
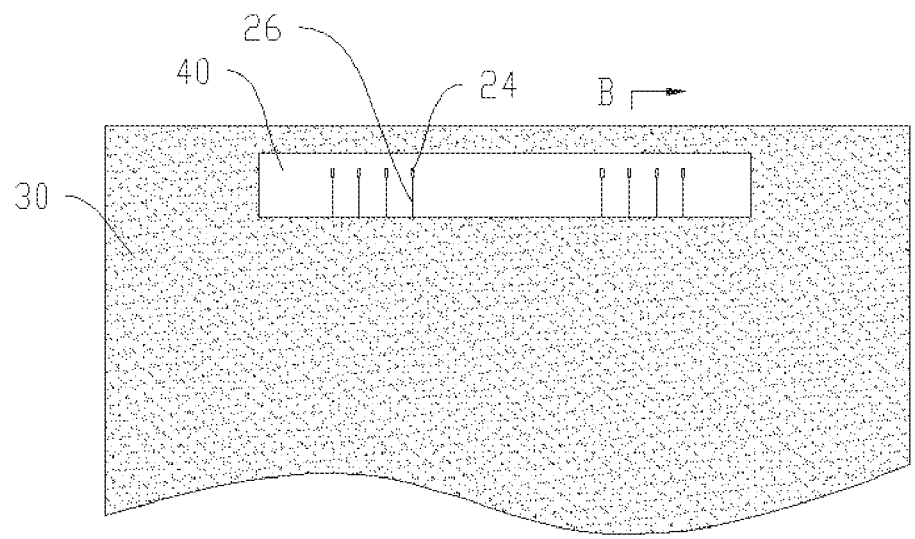
FIG. 6 is a schematic view showing step S103 of the method for manufacturing touch panel according to the present invention.
Figure 7:
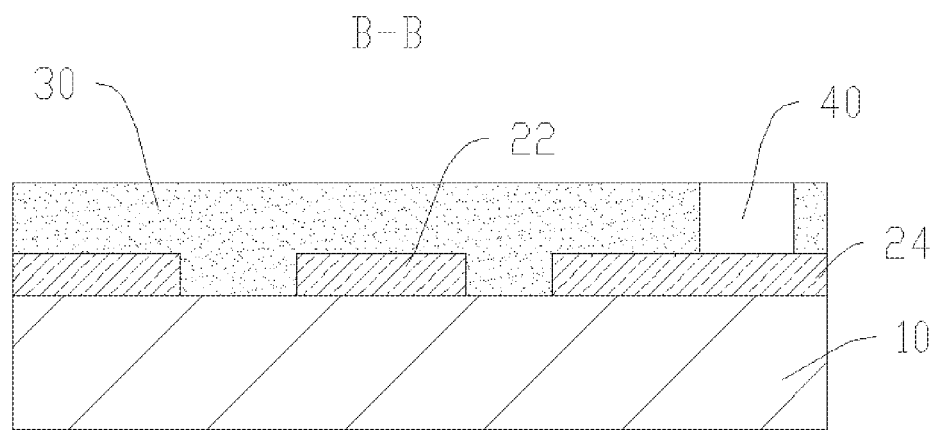
FIG. 7 is a schematic view showing the cross-section along B-B of FIG. 6.

Refer to FIG. 6 and FIG. 7. The insulating layer 30 is formed on the first electrode 22 and covers the first electrode 22. Specifically, the insulating layer 30 also covers the first lead wire 26. In other words, the first lead wire 26 is also located between the substrate 10 and the insulating layer 30. In an embodiment, the insulating layer 30 is made of an SiNx material.

Figure 8:
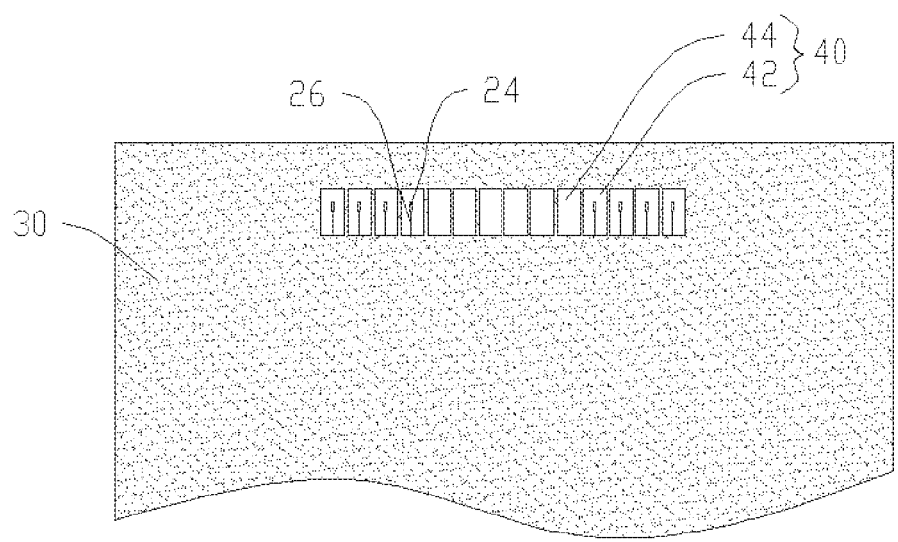
FIG. 8 is a schematic view showing an embodiment of step S103 of the method for manufacturing touch panel according to the present invention.

Refer to FIG. 7. In the present embodiment, the opening 40 penetrates the insulating layer 30, and the position of the opening 40 corresponds to the position of the first pin 24 to expose the first pin 24. In an embodiment, as shown in FIG. 6, there is only one openings 40 and the opening 40 is an elongated hole. Combined with FIG. 11, the one opening 40 exposes all the first pins 24 at the same time and the opening 40 also exposes a portion of the substrate 10 for exposing the second pin 54 subsequently. The approach of exposing all the first pins 24 and the second pins 54 with one opening 40 is simple and easy to implement. In another embodiment, as shown in FIG. 8, the number of the openings 40 is a plurality. Combined with FIG. 12, specifically, the opening 40 comprises a first opening 42 and a second opening 44. The first opening 42 corresponds to the position of the first pin 24 and the first opening 42 is for exposing the first pin 24; the second opening 44 corresponds to the position of the subsequently formed second pin 54 and the second opening 44 is used for extending a second lead wire 56 and exposing the second pin 54. Furthermore, each first pin 24 corresponds to a first opening 42 and each second pin 54 corresponds to a second opening 44. The insulation layer 30 covers the gap between the first pins, the gap between the first pin 24 and the second pin 54, and the gap between the second pins 54. As such, the insulation effect between the first pins 24, between the first pin 24 and the second pin 54, and between the second pins 54 is all improved.

Step S104: forming a second metal layer 50 on the insulating layer 30.

Figure 9:
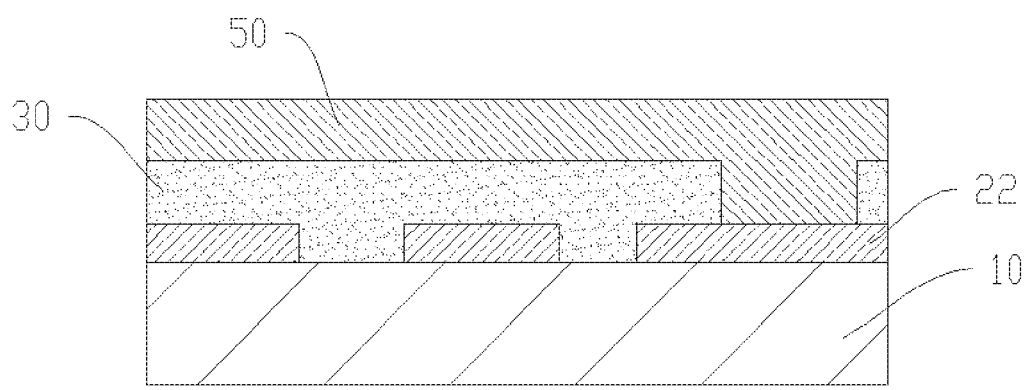
FIG. 9 is a schematic view showing step S104 of the method for manufacturing touch panel according to the present invention.

Refer to FIG. 9. In an embodiment, the second metal layer 50 is formed on the insulating layer 30 by a physical vapor deposition process. The insulating layer 30 insulates the structure formed by the second metal layer 50 and the first metal layer 20 from each other.

Step S105: patterning the second metal layer 50 to form a second electrode 52 and a second pin 54, the second electrode 52 and the second pin 54 being electrically interconnected; the first electrode 22 being disposed opposite to the second electrode 52, the second pin 24 being formed inside the opening 40, the first pin 24 and the second pin 54 being arranged in a zigzag manner.

Refer to FIG. 10 to FIG. 14. After the second metal layer 50 is patterned, the second electrode 52 is formed. The second electrode 52 is a metal electrode, which is conductive and has low impedance. The metal electrode also has a certain degree of flexibility and can be bent to a certain angle, which is favorable for making a flexible display device. The first electrode 22 and the second electrode 52 are oppositely disposed to form a capacitor structure for implementing a touch function. In an embodiment, when the first electrode 22 is stripe-shaped, the second electrode 52 is also a stripe electrode accordingly. In other embodiments, when the first electrode 22 is a diamond shape, the second electrode 52 is also a diamond electrode accordingly. In other words, the second electrode 52 has a shape corresponding to the shape of the first electrode 22.

Figure 10:
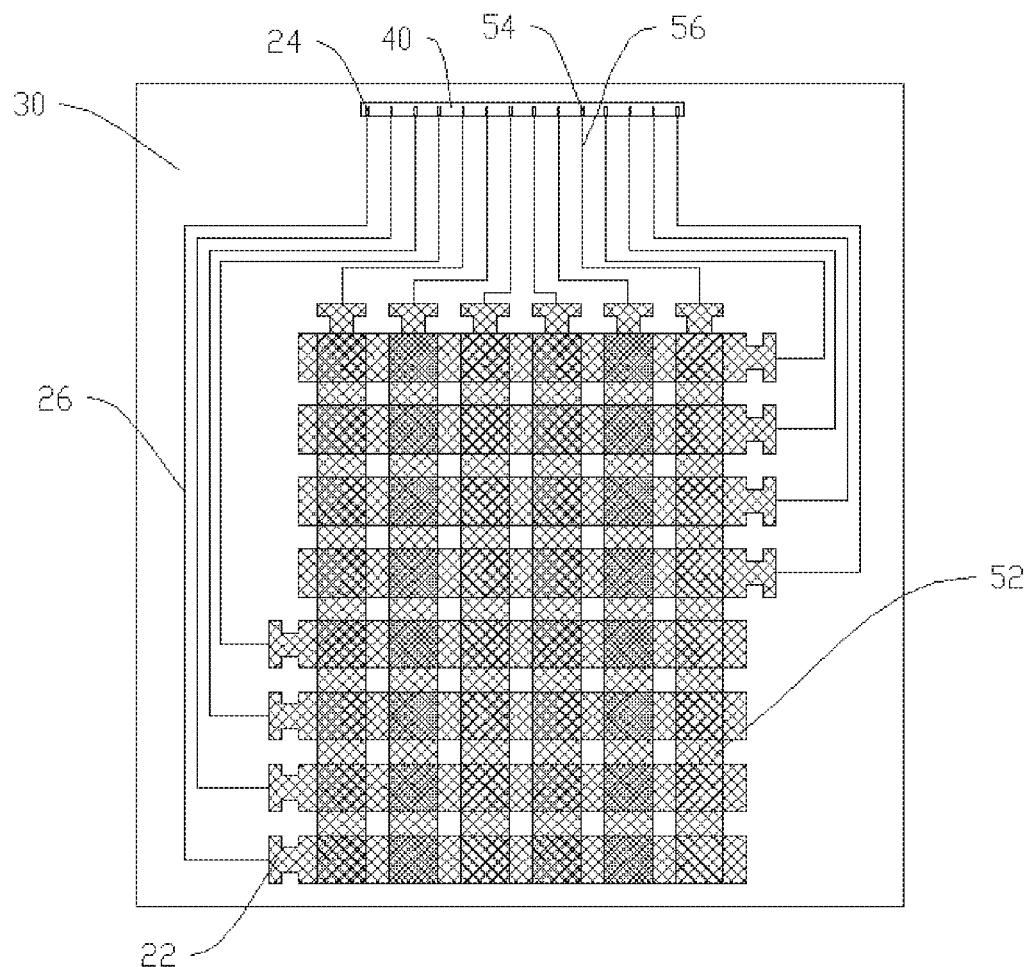
FIG. 10 is a schematic view showing step S105 of the method for manufacturing touch panel according to the present invention.

Specifically, refer to FIG. 10. In the present embodiment, in the process of patterning the second metal layer 50 to form the second electrode 52 and the second pin 54 electrically connected to each other, the patterned second metal layer 50 also forms a second lead wire 56 connecting the second electrode 52 to the second pin 54. Specifically, the number of the second electrodes 52, the number of the second pins 54, and the number of the second lead wires 56 are all a plurality. Each of the second pins 54 is electrically connected to a second electrode 52 through a second lead wire 56. The second electrodes 52, the second pins 54 and the second lead wires 56 are formed in the same patterning process. As such, the number of processes is reduced, the production efficiency is improved, the cost is saved. Moreover, the second electrode 52 and the second lead wire 56 are monolithically formed without using other element or material for bridging, which prevents defects caused by inaccurate bridging or increased impedance caused by bridging different materials. The second lead wire 56 and the second pin 54 are monolithically formed without using other element or material for bridging, which prevents defects caused by inaccurate bridging or increased impedance caused by bridging different materials. As a result, the yield rate is improved. In the present embodiment, the second pin 54 is a contact portion between the second lead wire 56 and a contact point of the flexible circuit board 70.

Figure 11:
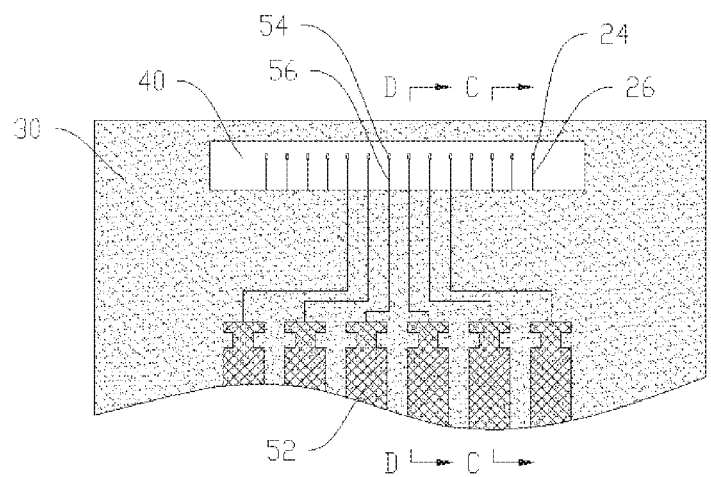
FIG. 11 is a partial enlarged view of FIG. 10.
Figure 12:
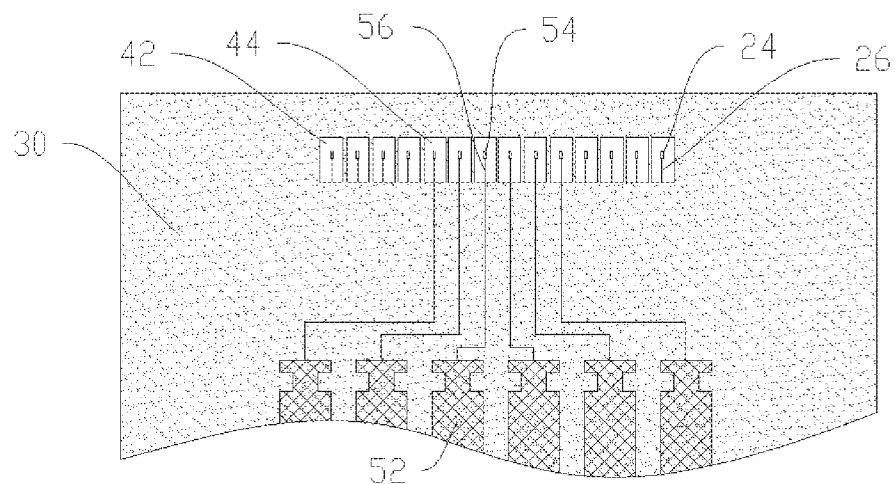
FIG. 12 is a schematic view showing an embodiment of step S105 of the method for manufacturing touch panel according to the present invention.
Figure 14:
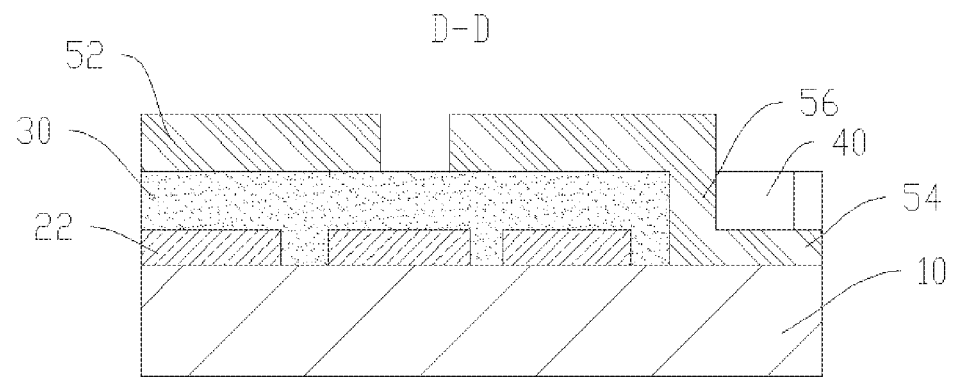
FIG. 14 is a schematic view showing the cross-section along D-D of FIG. 11.

Refer to FIG. 14. The second lead wire 56 passes through the opening 40 and extends to the substrate 10 for connecting with the second pin 54. In an embodiment, the opening 40 comprises a first portion and a second portion. The second lead wire 56 passes through the first portion and is connected to the second pin 54. The second pin 54 is connected to a touch chip 72 in the second portion. In an embodiment, as shown in FIG. 11, there is only one openings 40 and the opening 40 is an elongated hole. The one opening 40 exposes all the first pins 24 and the second pins 54 at the same time. The approach of exposing all the first pins 24 and the second pins 54 with one opening 40 is simple and easy to implement. In another embodiment, as shown in FIG. 12, the number of the openings 40 is a plurality. Combined with FIG. 12, specifically, the opening 40 comprises a first opening 42 and a second opening 44. The first opening 42 corresponds to the position of the first pin 24 and the first opening 42 is for exposing the first pin 24; the second opening 44 corresponds to the position of the subsequently formed second pin 54 and the second opening 44 is used for extending a second lead wire 56 and exposing the second pin 54. Furthermore, each first pin 24 corresponds to a first opening 42 and each second pin 54 corresponds to a second opening 44. The insulation layer 30 covers the gap between the first pins, the gap between the first pin 24 and the second pin 54, and the gap between the second pins 54. As such, the insulation effect between the first pins 24, between the first pin 24 and the second pin 54, and between the second pins 54 is all improved.

In the present embodiment, the second metal layer 50 is patterned by using a lithography process. Specifically, the process of patterning the second metal layer 50 comprises a step of applying photoresist, exposing and developing, etching the second metal layer 50, and so on. The lithography technology is a mature patterning technology and can provide a good patterning effect to meet the requirement of making the touch panel 100 in the present embodiment.

Refer to FIG. 11. The first pin 24 and the second pin 54 are located at one end of the touch panel 100 in the length direction and the plurality of first pins 24 and the plurality of second pins 54 are arranged on the same straight line. In an embodiment, the first lead wire 26 is routed from the two sides of the first electrode 22 and the second lead wire 56 is routed from the end of the touch panel 100 in the length direction, there is a gap between the first pins 24 respectively connected to two sides of the first electrode 22, and the second pin 54 is located at the gap. In the present embodiment, the first pin 24 and the second pin 54 form a binding area for binding the flexible circuit board and being electrically connected to the display panel or the motherboard through the flexible circuit board. The first pins 24 are insulated from each other, the second pins 54 are insulated from each other, and the first pin 24 and the second pin 54 are insulated from each other.

Figure 13:
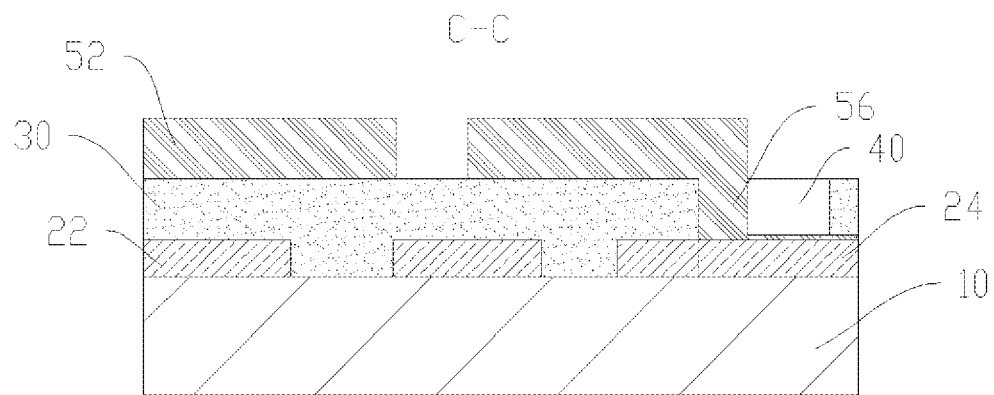
FIG. 13 is a schematic view showing the cross-section along C-C of FIG. 11.

Refer to FIG. 13 and FIG. 14. In an embodiment, the insulating layer 30 fills between the first electrode 22, the first lead wire 26 and the first pin 24, and between the second electrode 52, the second lead wire 56 and the second pin 54 to further improve the insulation effect.

Figure 15:
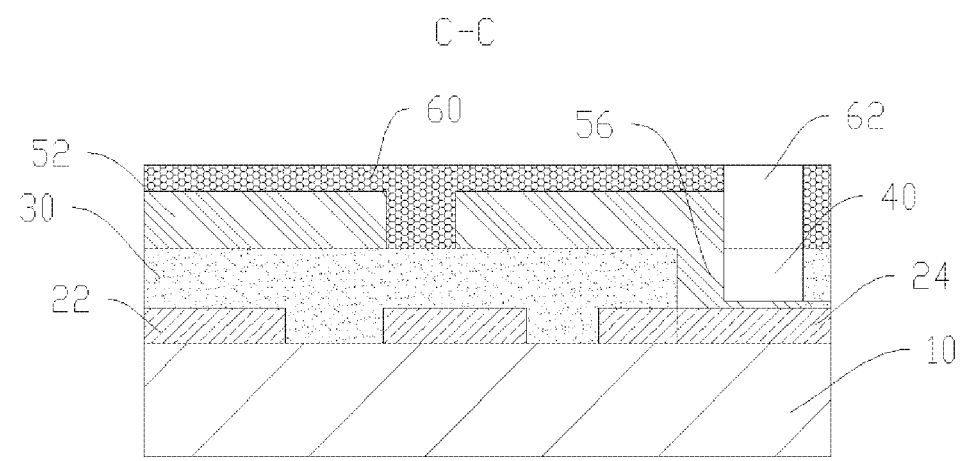
FIG. 15 is a schematic view showing an embodiment of step S105 of the method for manufacturing touch panel according to the present invention.

Refer to FIG. 15. In an embodiment, after forming the second electrode 52, a passivation layer 60 is further formed on the surface of the second electrode 52. The passivation layer 60 covers the second electrode 52 and the second lead wire 56 for protecting the second electrode 52 and the second lead wire 56 and avoids short-circuit with other elements of the touch panel 100 or the display device or the outside. In the present embodiment, the passivation layer 60 is provided with a via hole 62 facing the opening 40 of the insulating layer 30 to expose the first pin 24 and the second pin 54.

Step S106: providing a flexible circuit board 70 and fixing the flexible circuit board 70 to the first pin 24 and the second pin 54.

Figure 16:
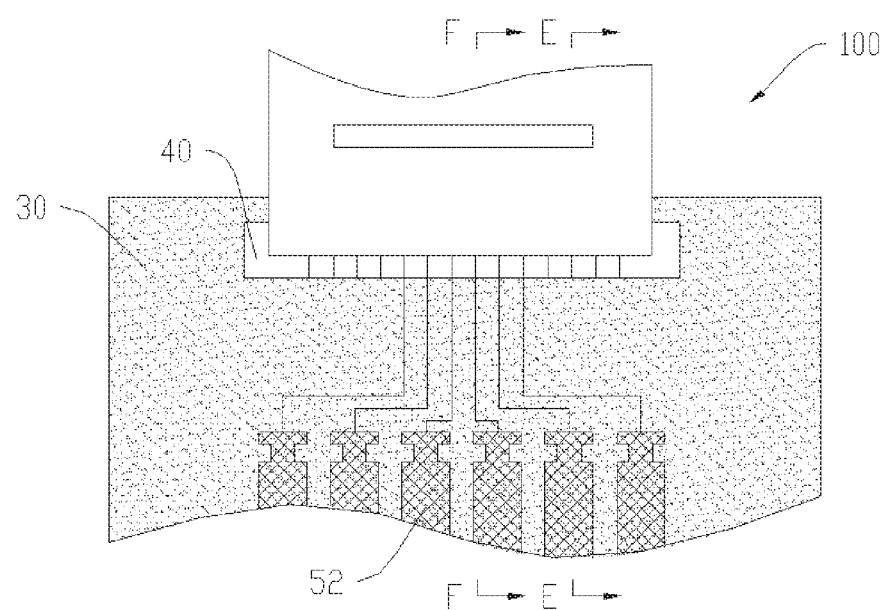
FIG. 16 is a schematic view showing step S106 of the method for manufacturing touch panel according to the present invention.
Figure 17:
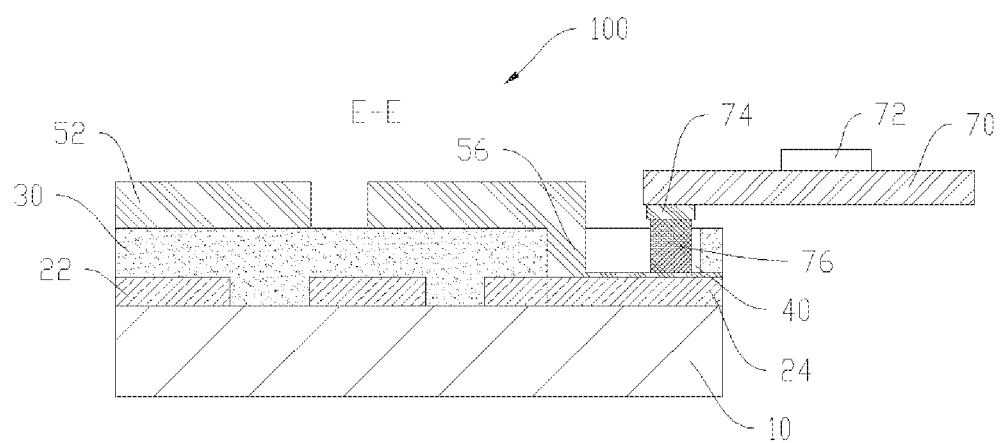
FIG. 17 is a schematic view showing the cross-section along E-E of FIG. 16.
Figure 18:
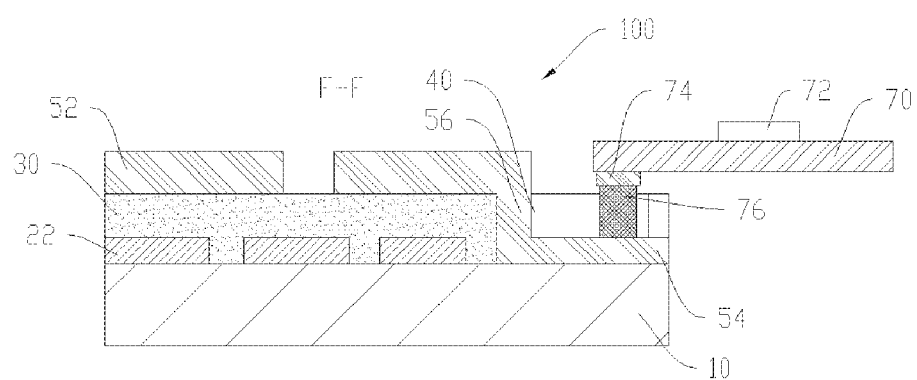
FIG. 18 is a schematic view showing the cross-section along F-F of FIG. 16.

Refer to FIG. 16 to FIG. 18. One end of the flexible circuit board 70 is disposed with a plurality of conductive contacts 74, i.e., the gold fingers. Each of the conductive contacts 74 is electrically connected to a first pin 24 or a second pin 54. Specifically, referring to FIG. 17 and FIG. 18, the conductive contact 74 is adhered to the first pin 24 or the second pin 54 through an anisotropic conductive film (ACF) 76. The ACF provides conduction between the conductive contact 74 and the corresponding first pin 24 or between the conductive contact 74 and the second pin 54, while insulating the first pin 24 and the second pin 54 from each other. In an embodiment, a touch chip 72 is disposed on the flexible circuit board 70. The touch chip 72 is electrically connected to the first electrode 22 through the wires in the flexible circuit board 70, the first pin 24, and the first lead wire 26, respectively. The touch chip 72 is electrically connected to the second electrode 52 through the wires in the flexible circuit board 70, the second pin 54, and the second lead wire 56 in sequence. The touch chip 72 senses the electrical signal change between the first electrode 22 and the second electrode 52 and identifies touch information. In other embodiments, the touch chip 72 may also be disposed on the first pin 24 or the second pin 54.

The first electrode 22 and the second electrode 52 are oppositely disposed to form the capacitive touch panel 100 and meet the requirements of touch function. The first electrode 22 and the second electrode 52 are made of a metal material, bendable, and suitable for a flexible display device. The material impedance is low. The first electrode 22 and the first pin 24, the second electrode 52 and the second pin 54 are patterned in the same process respectively to simplify the manufacturing process and save the production cost.

Refer to FIG. 16 to FIG. 18. The present invention also provides touch panel 100, which is manufactured by the manufacturing method described above. Specifically, the touch panel 100 comprises: a substrate 10, a first electrode 22, a first pin 24, an insulating layer 30, a second electrode 52 and a second pin 54. The first electrode 22 and the first pin 24 are located on the substrate 10. The first electrode 22 and the first pin 24 are electrically connected to each other. The insulating layer 30 is located on the first electrode 22. The insulating layer 30 is disposed with an opening 40 to expose the first pin 24. The second electrode 52 and the second pin 54 are located on the insulating layer 30. The second electrode 52 and the second pin 54 are electrically connected to each other. The first electrode 22 and the second electrode 52 are oppositely arranged. The second pin 54 is located within the opening 40, and the second pin 54 is offset from the first pin 24, i.e., in a zigzag manner.

In the present embodiment, the touch panel 100 further comprises a first lead wire 26 and a second lead wire 56. The first lead wire 26 connects the first electrode 22 to the first pin 24. The first lead wire is located between the substrate 10 and the insulating layer 30. The second lead wire 56 connects the second electrode 52 to the second pin 54. The second lead wire 56 passes through the opening 40 and extends to the substrate 10 to connect with the second pin 54.

In the present embodiment, the opening 40 comprises a first opening 42 and a second opening 44. The first opening 42 corresponds to the position of the first pin 24 and the first opening 42 is for exposing the first pin 24; the second opening 44 corresponds to the position of the subsequently formed second pin 54 and the second opening 44 is used for extending a second lead wire 56 and exposing the second pin 54. In an embodiment, the number of the first openings 42 is the same as the number of the first pins 24. Each first opening 42 exposes a first pin 24 correspondingly. The number of the second openings 44 is the same as the number of the second pins 54. Each second opening 44 exposes a second pin 54 correspondingly.

In the present embodiment, the number of the first electrodes 22 and the number of the first pins 24 are both a plurality. Each of the first electrodes 22 is electrically connected to a first pin 24. The number of the second electrodes 52 and the number of the second pins 54 are both a plurality. Each second electrode 52 is correspondingly electrically connected to a second pin 54.

In the present embodiment, one end of the flexible circuit board 70 is disposed with a plurality of conductive contacts 74, i.e., the gold fingers. Each of the conductive contacts 74 is electrically connected to a first pin 24 or a second pin 54. Specifically, referring to FIG. 17 and FIG. 18, the conductive contact 74 is adhered to the first pin 24 or the second pin 54 through an anisotropic conductive film (ACF) 76. The ACF provides conduction between the conductive contact 74 and the corresponding first pin 24 or between the conductive contact 74 and the second pin 54, while insulating the first pin 24 and the second pin 54 from each other. In the present embodiment, a touch chip 72 is disposed on the flexible circuit board 70. The touch chip 72 is electrically connected to the first electrode 22 through the wires in the flexible circuit board 70, the first pin 24, and the first lead wire 26, respectively. The touch chip 72 is electrically connected to the second electrode 52 through the wires in the flexible circuit board 70, the second pin 54, and the second lead wire 56 in sequence. The touch chip 72 senses the electrical signal change between the first electrode 22 and the second electrode 52 and identifies touch information.

The first electrode 22 and the second electrode 52 are oppositely disposed to form the capacitive touch panel 100 and meet the requirements of touch function. The first electrode 22 and the second electrode 52 are made of a metal material, bendable, and suitable for a flexible display device. The material impedance is low. The first electrode 22 and the first pin 24, the second electrode 52 and the second pin 54 are patterned in the same process respectively to simplify the manufacturing process and save the production cost.

Figure 19:
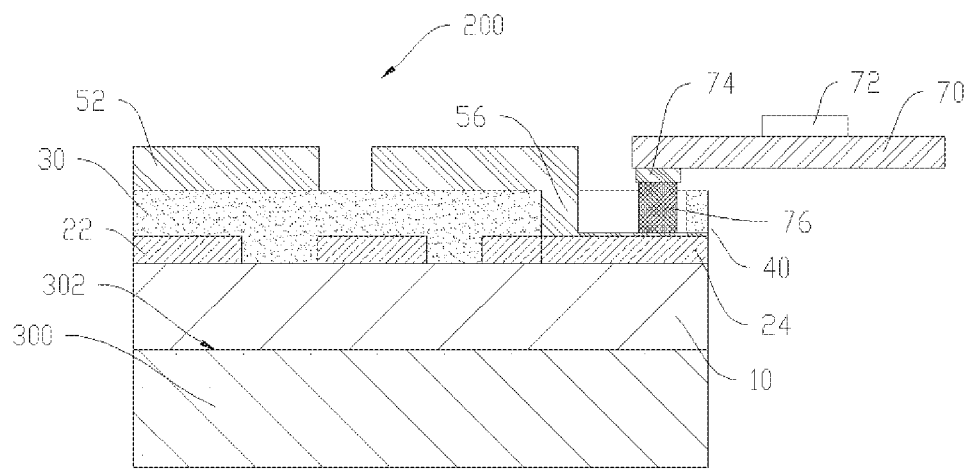
FIG. 19 is a schematic view showing the structure of the display device according to the present invention.

Refer to FIG. 19. The present invention also provides a display device 200, which comprises a display panel 300 and a touch panel 100 provided by the present invention. The touch panel 100 is fixed to a display side 302 of the display panel 300. In an embodiment, the display device 200 is a flexible display device 200, and both the display panel 300 and the touch panel 100 are flexible and bendable. The display panel 300 may be an active-matrix organic light emitting diode (AMOLED) display panel 300. The display device 200 can be a mobile phone, a television, a display, a tablet computer, and so on.

The first electrode 22 and the second electrode 52 are oppositely disposed to form the capacitive touch panel 100 and meet the requirements of touch function. The first electrode 22 and the second electrode 52 are made of a metal material, bendable, and suitable for a flexible display device 200. The material impedance is low. The first electrode 22 and the first pin 24, the second electrode 52 and the second pin 54 are patterned in the same process respectively to simplify the manufacturing process and save the production cost.

It should be noted that each of the embodiments in this specification is described in a progressive manner, each of which is primarily described in connection with other embodiments with emphasis on the difference parts. For the device embodiment, since it is substantially similar to the method embodiment, the description is relatively simple and the relevant description may be described in part of the method embodiment.

Embodiments of the present invention have been described, but not intending to impose any unduly constraint to the appended claims. Any modification of equivalent structure or equivalent process made according to the disclosure and drawings of the present invention is considered encompassed in the scope of protection defined by the claims of the present invention.

What is claimed is:

1. A touch panel, comprising:
a substrate;
a first electrode and a first pin, disposed on the substrate, the first electrode and the first pin being electrically interconnected;
an insulating layer disposed on the first electrode, the insulating layer being disposed with an opening to expose the first pin;
a second electrode and a second pin, disposed on the insulating layer, the second electrode and the second pin being electrically interconnected, the first electrode being disposed opposite to the second electrode, the second pin being disposed inside the opening, and the first pin and the second pin being arranged in a zigzag manner, wherein the first electrode and the first pin are formed of a first same layer of material and are integrally connected as a one-piece structure and the second electrode and the second pin are formed of a second same layer of material that is spaced from the first same layer of material of the first electrode and the first pin and are integrally connected a one-piece structure; and wherein the insulating layer has a portion located in the spacing between the first and second same layers of material, such that the first electrode and the second electrode are respectively located on two opposite sides of the insulating layer and the insulating layer is sandwiched between and in direct contact with the first and second electrodes.

2. The touch panel as claimed in claim 1, wherein the touch panel further comprises a first lead wire and a second lead wire, the first lead wire connects the first electrode to the first pin;

the second lead wire connects the second electrode to the second pin, and the second lead wire passes through the opening to connect with the second pin.

3. The touch panel as claimed in claim 1, wherein the number of the first electrodes and the number of the first pins are both a plurality, each first electrode is electrically connected to a corresponding first pin; the number of the second electrodes and the number of the second pins are both a plurality, each second electrode is electrically connected to a corresponding second pin.

4. The touch panel as claimed in claim 3, wherein the touch panel further comprises a flexible circuit board, the flexible circuit board is fixed to and connected to the first pins and the second pins.

5. The touch panel as claimed in claim 4, wherein a plurality of conductive touch strips are disposed at one end of the flexible circuit board, each conductive strip is electrically connected to a corresponding first pin or a corresponding second pin.

6. The touch panel as claimed in claim 1, wherein the openings comprise a first opening and a second opening; the first opening is located correspondingly to the first pin, the first opening is for exposing the first pin, the second opening is located correspondingly to the second pin, and the second pin is for extending the second lead wire and exposing the second pin.

* * * * *